United States Patent
Pramod

(10) Patent No.: US 11,171,595 B2
(45) Date of Patent: Nov. 9, 2021

(54) DETECTION OF PARAMETER IMBALANCE IN SYNCHRONOUS MOTOR DRIVES

(71) Applicant: Steering Solutions IP Holding Corporation, Saginaw, MI (US)

(72) Inventor: Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/698,039

(22) Filed: Nov. 27, 2019

(65) Prior Publication Data

US 2021/0159841 A1    May 27, 2021

(51) Int. Cl.
   H02P 29/024 (2016.01)
(52) U.S. Cl.
   CPC .............. H02P 29/0243 (2016.02)
(58) Field of Classification Search
   CPC ........ H02P 29/0243; H02P 21/00; H02P 6/08; H02P 6/10; H02K 37/14; H02K 21/14; H02K 1/145; B62D 5/04
   See application file for complete search history.

(56) References Cited

U.S. PATENT DOCUMENTS

| | | | |
|---|---|---|---|
| 6,426,602 B1 | 7/2002 | McCann et al. | |
| 9,806,656 B1 | 10/2017 | Pramod et al. | |
| 9,873,450 B2 | 1/2018 | Pramod et al. | |
| 9,966,890 B2 | 5/2018 | Pramod et al. | |
| 10,340,827 B2 | 7/2019 | Pramod et al. | |
| 2014/0091743 A1* | 4/2014 | Suzuki | H02P 29/027 318/400.22 |
| 2015/0155805 A1* | 6/2015 | Iwaji | H02P 6/187 318/400.33 |
| 2019/0115859 A1* | 4/2019 | Ishino | H02P 6/185 |

OTHER PUBLICATIONS

W. Xu and R. D. Lorenz, "High-Frequency Injection-Based Stator Flux Linkage and Torque Estimation for DB-DTFC Implementation on IPMSMs Considering Cross-Saturation Effects," in IEEE Transactions on Industry Applications, vol. 50, No. 6, pp. 3805-3815, Nov.-Dec. 2014, doi: 10.1109/TIA.2014.2322134. (Year: 2014).*

H. Li, T. Chen and H. Yao, "The full rank identification of PM flux linkage for PMSM," 2016 IEEE 8th International Power Electronics and Motion Control Conference (IPEMC-ECCE Asia), Hefei, China, 2016, pp. 2993-2998, doi: 10.1109/IPEMC.2016.7512773. (Year: 2016).*

(Continued)

*Primary Examiner* — Said Bouziane
(74) *Attorney, Agent, or Firm* — Dickinson Wright PLLC

(57) ABSTRACT

A method for detecting an imbalance in a synchronous motor drive, the method including reading an output voltage signal, and extracting a signature of a parameter imbalance from the output voltage signal. The parameter imbalance is in the synchronous motor drive. Responsive to extracting the signature of the parameter imbalance, the method further includes identifying a certain parameter having the parameter imbalance based on an operating condition of a synchronous motor controlled by the synchronous motor drive, and determining at least one phase of the synchronous motor in which the certain parameter is manifesting the parameter imbalance.

17 Claims, 5 Drawing Sheets

(56) References Cited

OTHER PUBLICATIONS

Jahns et al., "Pulsating Torque Minimization Techniques for Permanent Magnet AC Motor Drives—A Review", IEEE (Institute of Electrical and Electronics Engineers) Transactions on Industrial Electronics, Apr. 1996, pp. 321-330, vol. 43, No. 2.

Xu et al., "Torque Ripple Minimization Using Online Estimation of Stator Resistances With Consideration of Magnetic Saturations", IEEE (Institute of Electrical and Electronics Engineers) Transactions on Industrial Electronics, Sep. 2014, pp. 5105-5114, vol. 61, No. 9.

* cited by examiner

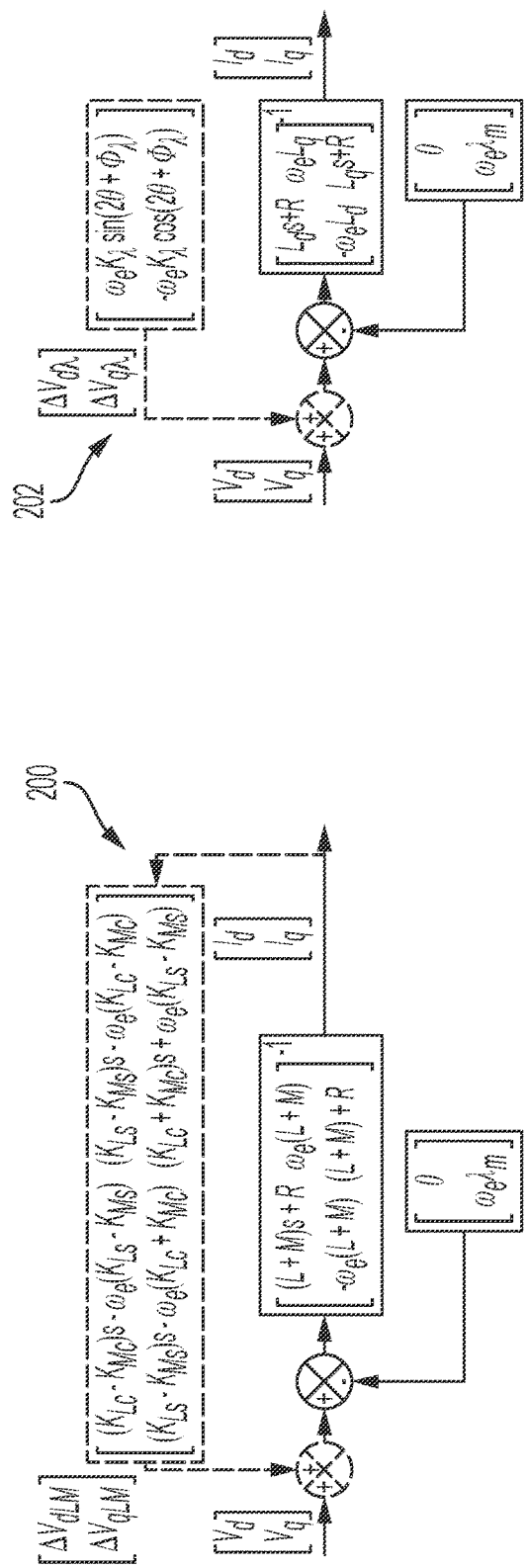
FIG. 2A
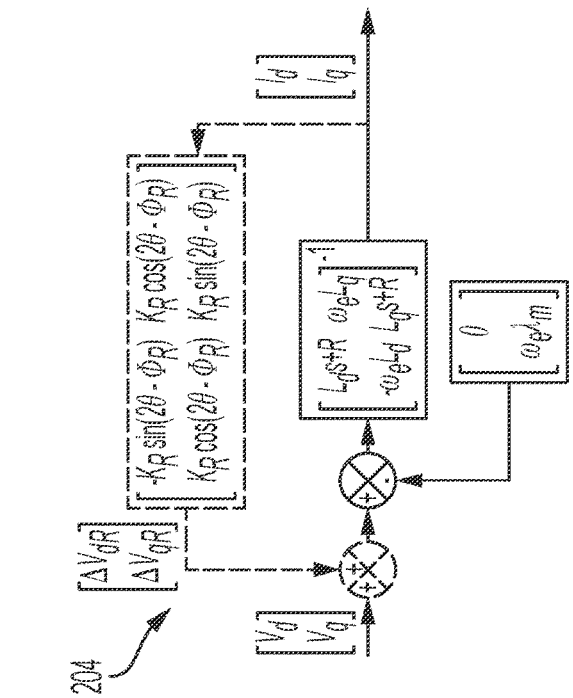
FIG. 2B
FIG. 2C

DETECTION OF PARAMETER IMBALANCE IN SYNCHRONOUS MOTOR DRIVES

TECHNICAL FIELD

This disclosure relates to motors and in particular to systems and methods for detection of parameter imbalances in synchronous motor drives.

BACKGROUND

Motor drive applications utilizing synchronous machines may be susceptible to parameter imbalance during manufacturing and/or during operation. However, some requirements and/or regulations specify that certain machines satisfy minimal part-to-part variation. For example, high performance motion control applications that are noise, vibration, and harshness sensitive, particularly ones involving mass manufacturing, such as electric power steering (EPS), are subject to requirements that specify the machines satisfy a minimal part-to-part variation. The parameter imbalances exhibited by the synchronous motor drives that are subject to such requirements may make compliance with the requirements difficult.

SUMMARY

This disclosure relates generally to detection of parameter imbalances in synchronous motor drives.

An aspect of the disclosed embodiments includes a system for detecting an imbalance in a synchronous motor drive. The system includes the synchronous motor. The system includes a processor and a memory. The memory includes instructions that, when executed by the processor, cause the processor to: read an output voltage signal, extract a signature of a parameter imbalance from the output voltage signal, wherein the parameter imbalance is in the synchronous motor drive, responsive to extracting the signature of the parameter imbalance, identify a certain parameter having the parameter imbalance based on an operating condition of the synchronous motor, and determine at least one phase of the synchronous motor in which the certain parameter is manifesting the parameter imbalance.

Another aspect of the disclosed embodiments includes a method for detecting an imbalance in a synchronous motor drive. The method includes reading an output voltage signal. The method also includes extracting a signature of a parameter imbalance from the output voltage signal. The parameter imbalance is in the synchronous motor drive. Responsive to extracting the signature of the parameter imbalance, the method further includes identifying a certain parameter having the parameter imbalance based on an operating condition of a synchronous motor controlled by the synchronous motor drive. The method also includes determining at least one phase of the synchronous motor in which the certain parameter is manifesting the parameter imbalance.

Another aspect of the disclosed embodiments includes an electronic device. The electronic device includes a processor and a memory. The memory includes instructions that, when executed by the processor, cause the processor to: read an output voltage signal, extract a signature of a parameter imbalance from the output voltage signal, wherein the parameter imbalance is in the synchronous motor drive, responsive to extracting the signature of the parameter imbalance, identify a certain parameter having the parameter imbalance based on an operating condition of the synchronous motor, and determine at least one phase of the synchronous motor in which the certain parameter is manifesting the parameter imbalance.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2A-2C generally illustrate block diagrams for mathematical models incorporating parameter imbalance according to the principles of the present disclosure.

DETAILED DESCRIPTION

Figure 1:
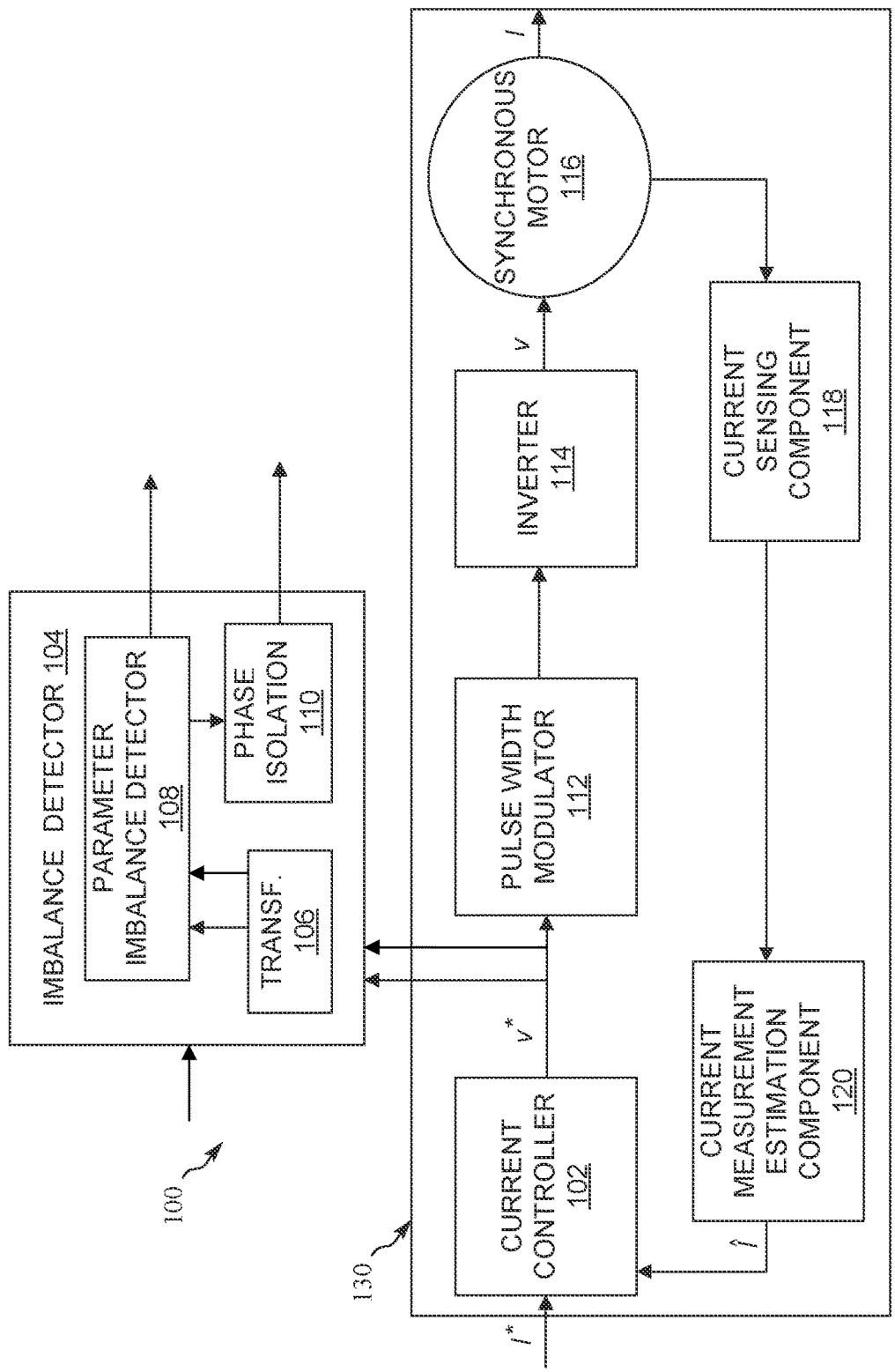
FIG. 1 generally illustrates a parameter imbalance detection and identification system according to the principles of the present disclosure.

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As will be described, machines (e.g., vehicles, boats, airplanes, drones, power equipment, yard equipment, pumps, compressors, etc.) using synchronous motor drives may be susceptible to parameter imbalance during manufacturing and/or during operation. For example, a motor drive, converter, and/or other circuitry may experience a parameter imbalance. High performance motion control system applications, particularly ones involving mass manufacturing such as electric power steering (EPS), may be sensitive to noise, vibration, and harshness and may specify minimal part to part variation. Parameter imbalance(s) that are left undetected and/or uncorrected in such systems may result in overall system performance degradation and/or faults. However, employing tight tolerance on the manufacturing side and/or on the production side of the synchronous motors for parameter imbalance may be expensive. Further, the overall system degradation may reduce the longevity of the synchronous motors, and/or may reduce the likelihood that a customer may purchase a EPS system that includes the synchronous motor. As a result, it is desirable to detect and identify the parameter imbalances.

Certain non-linear effects, such as temperatures or failure modes may result in a significant change in the behavior of a machine. These non-linear effects may be manifested as parameter imbalance in the synchronous motor drive. Detection, identification, and/or correction of such non-linear effects may be beneficial for improving performance of machines including synchronous motor drives controlling synchronous motors.

Accordingly, systems and methods, such as those described herein, may be configured to addresses the issues above by providing techniques for detecting and identifying parameter imbalances, as well as performing preventive actions based on the parameter imbalances. In some embodiments, the systems and methods described herein may be configured to enable detecting parameter imbalances, learning from the detected parameter imbalances, and compensating for parameter imbalance induced effects on the synchronous motor drive.

In some embodiments, the systems and methods described herein may be configured to provide techniques for real-time detection of inter-phase parameter imbalance in feedback controlled synchronous motor drives. The systems and methods described herein may be configured to use various mathematical models to detect a parameter imbalance, identify which parameter is imbalanced based on an operating condition of the synchronous motor drive, and/or determine at least one phase of the synchronous motor drive, at which the certain parameter has the imbalance.

In some embodiments, the systems and methods described herein may be configured to perform a preventative action based on the identified parameter that is imbalanced and/or the at least one phase that is determined to have the imbalanced parameter. The preventative action may include causing imbalanced parameter at a particular phase to be rebalanced or other suitable preventative action.

The systems and methods described herein are configured to provide at least the benefits of detecting and identifying any type of parameter imbalance in a synchronous motor. The systems and methods described herein are applicable for various machine configurations (e.g., permanent magnet or wound, non-salient or salient, multiple phases, etc.). Further, the systems and methods described herein may be implemented by a processor for real-time detection, identification, and/or correction while the synchronous motor is being operated. The systems and methods described herein may also be implemented by a processor at the end of line (EOL) at manufacturing plants.

FIG. 1 generally illustrates a parameter imbalance detection and identification system (e.g., "PIDI system") 100 according to the principles of the present disclosure. The PIDI system 100 may include a current controller 102, an imbalance detector 104, a pulse width modulator 112, an inverter 114, a synchronous motor 116, a current sensing component 118, and a current estimation component 120. It should be noted that fewer or more components may be included in the PIDI system 100 as desired to perform the techniques disclosed herein and the components depicted are for explanatory purposes. The synchronous motor 116 may generate rotational or linear force used to power a machine, such as those described herein. Various components of the PIDI system 100 may be used as part of a synchronous motor drive 130 (e.g., current controller 102, pulse width modulator 112, inverter 114, or some combination thereof). A synchronous motor drive 130 may be an electronic device that harnesses and controls the electrical energy sent to the synchronous motor 116. The synchronous motor drive 130 may feed voltage into the synchronous motor 116 in varying amounts and at varying frequencies, thereby indirectly controlling the speed and torque of the synchronous motor 116.

The current controller 102 may receive a commanded current (I*) that is input by a user using a computing device or is preprogrammed by default for the synchronous motor 116. In some embodiments, the current controller 102 is used in a feedback controlled synchronous motor drive 130 to track the commanded currents with minimal error. The current controller 102 transmits an output voltage signal to the pulse width modulator 112. The pulse width modulator 112 may control the proportion of time the output voltage signal is high compared to when it is low over a consistent period of time. Such a technique of controlling the proportion of time when the output voltage signal is high and low may control the direction of the synchronous motor 116. The inverter 114 may be a voltage source inverter and may vary the frequency of the voltage fed to the synchronous motor 116 to control the torque of the synchronous motor 116. The synchronous motor 116 may receive an output voltage signal (V) as an input. The synchronous motor 116 may use the input voltage and generate an amount of current that may be equal to the commanded current or vary from the commanded current (e.g., when there is a parameter imbalance).

The current (I) output from the synchronous motor 116 may be sensed by a current sensing component 118. Any suitable type of current sensing component 118 may be used that is capable of detecting an electric current in a circuit, such as current sensor. The current sensing component 118 may provide signals indicating the current to the current estimation component 120. The current estimation component may be capable of receiving the signals indicative of the current and measuring the amount of current output by the synchronous motor 116. The current measurement estimation component 120 outputs the estimation current ($\hat{I}$) to the current controller 102. Accordingly, as depicted, closed loop current control is utilized by the PIDI system 100.

The current controller 102 may receive the estimated current and compare it to the commanded current. If there is any difference, the current controller 102 may transmit an output voltage signal (V*) that will cause the estimated current $\hat{I}$ to exactly match the commanded current I*. As such, since the commanded current I* is constant and the estimated current $\hat{I}$ equals the commanded current I*, then the estimated current $\hat{I}$ is also constant. To maintain the constant current, the current controller 102 may pulsate the output voltage signal.

The imbalance detector 104 reads the output voltage signal from the current controller 102. The imbalance detector 104 includes a mathematical transform (transformation block 106), a parameter imbalance detector 108, and a phase isolation 110. In some embodiments, the system 100 may include one or more bypass filters. The bypass filters may be configured to perform pre-filtering using bandpass filters in the synchronous frame before transformation or use adaptive low-pass filters in the pseudo-stationary framed tuned (adaptively) in accordance with the pulsation frequency of two times the synchronous frequency.

As will be described, the parameter imbalance detector 108 may use mathematical models to extract a signature of a parameter imbalance (e.g., in the event that a parameter imbalance is present). The parameter imbalance detector 108 receives the output voltage signal. The parameter imbalance detector 108 determines whether a parameter imbalance exists based on the output voltage signal. For example, if the parameter imbalance detector 108 determines that the output voltage signal just includes a constant part, without a sinusoidal part, then parameter imbalance detector 108 determines there is no parameter imbalance represented in the output voltage signal. The sinusoidal part may refer to pulsating portion of the output voltage signal and may represent at least the signature of the parameter imbalance. If the parameter imbalance detector 108 determines the output voltage signal includes the constant part and the sinusoidal part, then the parameter imbalance detector 108 determines a parameter imbalance is detected because the sinusoidal part represents the signature of the parameter imbalance.

Further details about the output voltage signal may be determined by the parameter imbalance detector 108, such as the certain parameter that has the imbalance. The parameter imbalance detector 108 may determine such using the mathematical models, as will be described, to identify a certain parameter having the parameter imbalance based on an operating condition of the synchronous motor 116. The operating condition may pertain to a speed of the synchronous motor 116 satisfying a threshold and a current output by the synchronous motor satisfying a particular threshold. Further, as will be described, the phase isolation 110 determines at least one phase of the synchronous motor at which the certain parameter has the parameter imbalance. In some embodiments, more than one phase may be determined to include the parameter imbalance. The certain parameter and/or the phase(s) at which the parameter imbalance is present may be output and a controller or circuitry may perform a preventative action, such as reducing the imbalance to reduce the effects on the synchronous motor, shutting off the synchronous motor 116, or the like.

The following discussion pertains to the mathematical models used to perform the techniques described herein. A stationary reference frame machine model may be expressed as follows:

$$V_a = R_a I_a + \dot{\lambda}_a$$

$$V_b = R_b I_b + \dot{\lambda}_b$$

$$V_c = R_c I_c + \dot{\lambda}_c$$

$$\lambda_a = L_a I_a - M_{ab} I_b - M_{ac} I_c - \lambda_{am} \cos\theta \quad (1)$$

$$\lambda_b = L_b I_b - M_{ba} I_a - M_{bc} I_c - \lambda_{bm} \cos(\theta-\beta)$$

$$\lambda_c = L_c I_c - M_{ca} I_a - M_{cb} I_b - \lambda_{cm} \cos(\theta-2\beta)$$

where V is voltage, I is current, R is resistance, L is inductance, λ is flux linkage, and $\lambda_{am}$, $\lambda_{bm}$, and $\lambda_{cm}$ represent permanent magnet (PM) flux linkage at different phases a, b, and c, θ is the electrical position and β is a constant equal to $$\frac{2\pi}{3}$$

radians respectively. The desirable thing for each parameter (resistance, inductance, and PM flux linkage is for each parameter at each phase to be equal to one another. That is, for PM flux linkage, $\lambda_{am}$, $\lambda_{bm}$, and $\lambda_{cm}$ should all be equal. However, a non-linear effect may cause the parameters to be different at one or more of the phases. Accordingly, (1) may be modified using the following reference frame transformation shown in (2) to generate a synchronous reference frame machine model given in (3) that includes the effects of the parameter imbalance:

$$h_{dq0} = T h_{abc} \quad (2)$$

$$T = \frac{2}{3}\begin{Bmatrix} \cos\theta & \cos(\theta-\beta) & \cos(\theta-2\beta) \\ \sin\theta & \sin(\theta-\beta) & \sin(\theta-2\beta) \\ \frac{1}{2} & \frac{1}{2} & \frac{1}{2} \end{Bmatrix}$$

$$V_d = V_{di} + \Delta V_{dR} + \Delta V_{d\lambda} + \Delta V_{dLM}$$

$$V_q = V_{qi} + \Delta V_{qR} + \Delta V_{q\lambda} + \Delta V_{qLM}$$

$$V_{di} = RI_d + (L+M)(\dot{i}_d + \omega_e I_q) \quad (3)$$

$$V_{qi} = RI_q + (L+M)(\dot{i}_q - \omega_e I_d) + \omega_e \lambda_m$$

where $\Delta V_{dLM}$ and $\Delta V_{qLM}$ incorporate inductance imbalance, $\Delta V_{d\lambda}$ and $\Delta V_{q\lambda}$ represent flux linkage imbalance, and $\Delta V_{dR}$ and $\Delta V_{qR}$ include resistance imbalance, R is the nominal or average resistance, L and M are the nominal or average self and mutual inductance respectively and $\lambda_m$ is the nominal or average PM flux linkage. In some embodiments, the current controller 102 is used in a feedback controlled synchronous motor drive 130 to track the commanded currents with minimal error. If the estimated current (assumed to be the same as actual in the absence of measurement errors) and commanded currents are assumed to be equal, the pulsating voltage terms due to permanent magnet flux linkage imbalance in the synchronous reference frame are as follows:

$$\begin{bmatrix} V_{d\lambda} \\ V_{q\lambda} \end{bmatrix} = \omega_e K_\lambda \begin{bmatrix} \sin(2\theta+\phi_\lambda) \\ -\cos(2\theta+\phi_\lambda) \end{bmatrix} \quad (4)$$

$$K_\lambda = \frac{1}{3}\sqrt{\Delta\lambda_a^2 + \Delta\lambda_b^2 + \Delta\lambda_c^2 - \Delta\lambda_a\Delta\lambda_b - \Delta\lambda_b\Delta\lambda_c - \Delta\lambda_c\Delta\lambda_a} \quad (5)$$

$$\phi_\lambda = \tan^{-1}\left(\frac{\sqrt{3}(-\Delta\lambda_b + \Delta\lambda_c)}{2\Delta\lambda_a - \Delta\lambda_b - \Delta\lambda_c}\right) \quad (6)$$

where $\Delta\lambda_x$ represents the deviation of the PM flux linkage magnitude in phase x from the nominal value $\lambda_m$ which is the average of the magnitudes of the PM flux linkages $\lambda_{xm}$ of the individual phases.

A mathematical transformation may be applied to convert the pulsating components into a pseudo-stationary diagnostic reference frame as follows:

$$\begin{bmatrix} V_{u\lambda} \\ V_{v\lambda} \end{bmatrix} = \begin{bmatrix} \cos 2\theta & \sin 2\theta \\ \sin 2\theta & -\cos 2\theta \end{bmatrix}\begin{bmatrix} \Delta V_{d\lambda} \\ \Delta V_{q\lambda} \end{bmatrix} = \omega_e K_\lambda \begin{bmatrix} \sin\phi_\lambda \\ -\cos\phi_\lambda \end{bmatrix} \quad (7)$$

The diagnostic voltages may be further modified to obtain segregate the magnitude and phase components as follows:

$$\begin{bmatrix} V_{m\lambda} \\ \gamma_\lambda \end{bmatrix} = \begin{bmatrix} \sqrt{V_{u\lambda}^2 + V_{v\lambda}^2} \\ \angle\left(\frac{V_{u\lambda}}{V_{v\lambda}}\right) \end{bmatrix} = \begin{bmatrix} K_\lambda \omega_e \\ -\phi_\lambda \end{bmatrix} \quad (8)$$

where $V_{m\lambda}$ is voltage magnitude for flux linkage imbalance and $\gamma_\lambda$ is phase for flux linkage imbalance.

Similarly, voltage pulsations in the synchronous reference frame and the transformed (demodulated) voltages in the diagnostic frame due to inductance imbalance are expressed as follows:

$$\Delta V_{dL} = (K_L \cos(2\theta + \phi_L) - K_M \cos(2\theta + \phi_M))(\dot{I}_d + \omega_e I_q) + \quad (9)$$
$$(K_L \sin(2\theta + \phi_L) - K_M \sin(2\theta + \phi_M))(-\omega_e I_d + \dot{I}_q)$$
$$\Delta V_{qL} = (K_L \sin(2\theta + \phi_L) - K_M \sin(2\theta + \phi_M))(\dot{I}_d + \omega_e I_q) +$$
$$(-K_L \cos(2\theta + \phi_L) + K_M \cos(2\theta + \phi_M))(-\omega_e I_d + \dot{I}_q)$$

$$K_L = \frac{1}{3}\sqrt{\begin{array}{l}\Delta L_a^2 + \Delta L_b^2 + \Delta L_c^2 - \\ \Delta L_a \Delta L_b - \Delta L_a \Delta L_c - \Delta L_b \Delta L_c\end{array}} \quad (10)$$

$$\phi_L = \tan^{-1}\left(\frac{\sqrt{3}(-\Delta L_b + \Delta L_c)}{2\Delta L_a - \Delta L_b - \Delta L_c}\right)$$

$$K_M = \frac{2}{3}\sqrt{\begin{array}{l}M_{ab}^2 + M_{bc}^2 + M_{ca}^2 - \\ M_{ab}M_{ac} - M_{ab}M_{cb} - M_{ac}M_{cb}\end{array}} \quad (11)$$

$$\phi_M = \tan^{-1}\left(\frac{\sqrt{3}(-M_{ab} + M_{ac})}{-M_{ab} - M_{ac} + 2M_{cb}}\right)$$

$$\begin{bmatrix} V_{uL} \\ V_{vL} \end{bmatrix} = \begin{bmatrix} \cos 2\theta & \sin 2\theta \\ \sin 2\theta & -\cos 2\theta \end{bmatrix} \begin{bmatrix} \Delta V_{dL} \\ \Delta V_{qL} \end{bmatrix} = \quad (12)$$
$$\omega_e \begin{bmatrix} K_L \sin\phi_L - K_M \sin\phi_M & K_L \cos\phi_L - K_M \cos\phi_M \\ K_L \cos\phi_L - K_M \cos\phi_M & -K_L \sin\phi_L + K_M \sin\phi_M \end{bmatrix} \begin{bmatrix} -I_d \\ I_q \end{bmatrix}$$

where $\Delta L_x$ represents the deviation of the self-inductance in phase x from the nominal value L which is the average of the magnitudes of the self-inductances $L_x$ of the individual phases, and where $\Delta M_{xy}$ represents the deviation of the mutual-inductance between phases x and y from the nominal value M which is the average of the magnitudes of the mutual-inductances $M_{xy}$ between the three sets of phases.

The voltage magnitude and phase for inductance imbalance may be obtained and simplified by representing the synchronous frame currents in polar form, i.e., assuming $I_d = I_m \sin\alpha$ and $I_q = I_m \cos\alpha$, where $I_m$ and $\alpha$ are the magnitude and phase of the current respectively, as follows:

$$\begin{bmatrix} V_{mL} \\ \gamma_L \end{bmatrix} = \begin{bmatrix} \sqrt{V_{uL}^2 + V_{vL}^2} \\ \angle\left(\frac{V_{uL}}{V_{vL}}\right) \end{bmatrix} = \begin{bmatrix} \omega_e I_m \sqrt{\begin{array}{l}K_L^2 + K_M^2 - \\ K_L K_M \cos(\phi_L - \phi_M)\end{array}} \\ \tan^{-1}\left(\begin{array}{l}K_L \cos(\alpha + \phi_L) + \\ K_M \cos(\alpha + \phi_M) \\ -K_L \sin(\alpha + \phi_L) + \\ K_M \sin(\alpha + \phi_M)\end{array}\right) \end{bmatrix} \quad (13)$$

where $V_{mL}$ is voltage magnitude for inductance imbalance and $\gamma_L$ is phase for inductance imbalance.

It should be noted that for imbalance in either self or mutual inductance only results in significantly simplified terms for magnitude and phase that can be used to identify the imbalance.

The resistance imbalance induced voltage terms are expressed as follows:

$$V_{dR} = K_R \cos(2\theta + \phi_R) I_d + K_R \sin(2\theta + \phi_R) I_q \quad (14)$$
$$V_{qR} = K_R \sin(2\theta + \phi_R) I_d - K_R \cos(2\theta + \phi_R) I_q$$

$$K_R = \frac{1}{3}\sqrt{\begin{array}{l}\Delta R_a^2 + \Delta R_b^2 + \Delta R_c^2 - \\ \Delta R_a \Delta R_b - \Delta R_b \Delta R_c - \Delta R_c \Delta R_a\end{array}} \quad (15)$$

$$\phi_R = \tan^{-1}\left(\frac{\sqrt{3}(-\Delta R_b + \Delta R_c)}{2\Delta R_a - \Delta R_b - \Delta R_c}\right)$$

$$\begin{bmatrix} V_{uR} \\ V_{vR} \end{bmatrix} = \begin{bmatrix} \cos 2\theta & \sin 2\theta \\ \sin 2\theta & -\cos 2\theta \end{bmatrix} \begin{bmatrix} V_d \\ V_q \end{bmatrix} = K_R \begin{bmatrix} \cos\phi_R & \sin\phi_R \\ -\sin\phi_R & \cos\phi_R \end{bmatrix} \begin{bmatrix} I_d \\ I_q \end{bmatrix} \quad (16)$$

where $\Delta R_x$ represents the deviation of the resistance in phase x from the nominal value R which is the average of the magnitudes of the resistances $R_x$ of the individual phases.

The voltage magnitude and phase for resistance imbalance may be expressed as follows:

$$\begin{bmatrix} V_{mR} \\ \gamma_R \end{bmatrix} = \begin{bmatrix} \sqrt{V_{uR}^2 + V_{vR}^2} \\ \angle\left(\frac{V_{uR}}{V_{vR}}\right) \end{bmatrix} = \begin{bmatrix} K_R I_m \\ \alpha + \phi_R \end{bmatrix} \quad (17)$$

where $V_{mR}$ is voltage magnitude for resistance imbalance and $\gamma_R$ is phase for resistance imbalance.

From the three sets of equations for flux linkage imbalance, resistance, and inductance it is clear that the three imbalances have significant effects in certain regions of operation only. Resistance imbalance is dominant at high currents and low speeds, while flux linkage imbalance is significant at low current and high speed regions. Inductance imbalance becomes prominent when both the current and speeds are significant. Thus, operating region based diagnostic thresholds may be setup in order to detect and isolate the different effects. Further, once the particular parameter that is imbalanced is detected, the specific phase that has the imbalance may be determined from the phase values of the imbalance coefficients being unique for a given phase.

FIG. 2A-2C generally illustrate block diagrams for mathematical models incorporating parameter imbalance according to the principles of the present disclosure. FIG. 2A depicts a model 200 representing inductance imbalance of (13) above. FIG. 2B depicts a model 202 representing PM flux linkage imbalance of (8). FIG. 2C depicts a model 204 representing resistance imbalance of (17).

Figure 3:
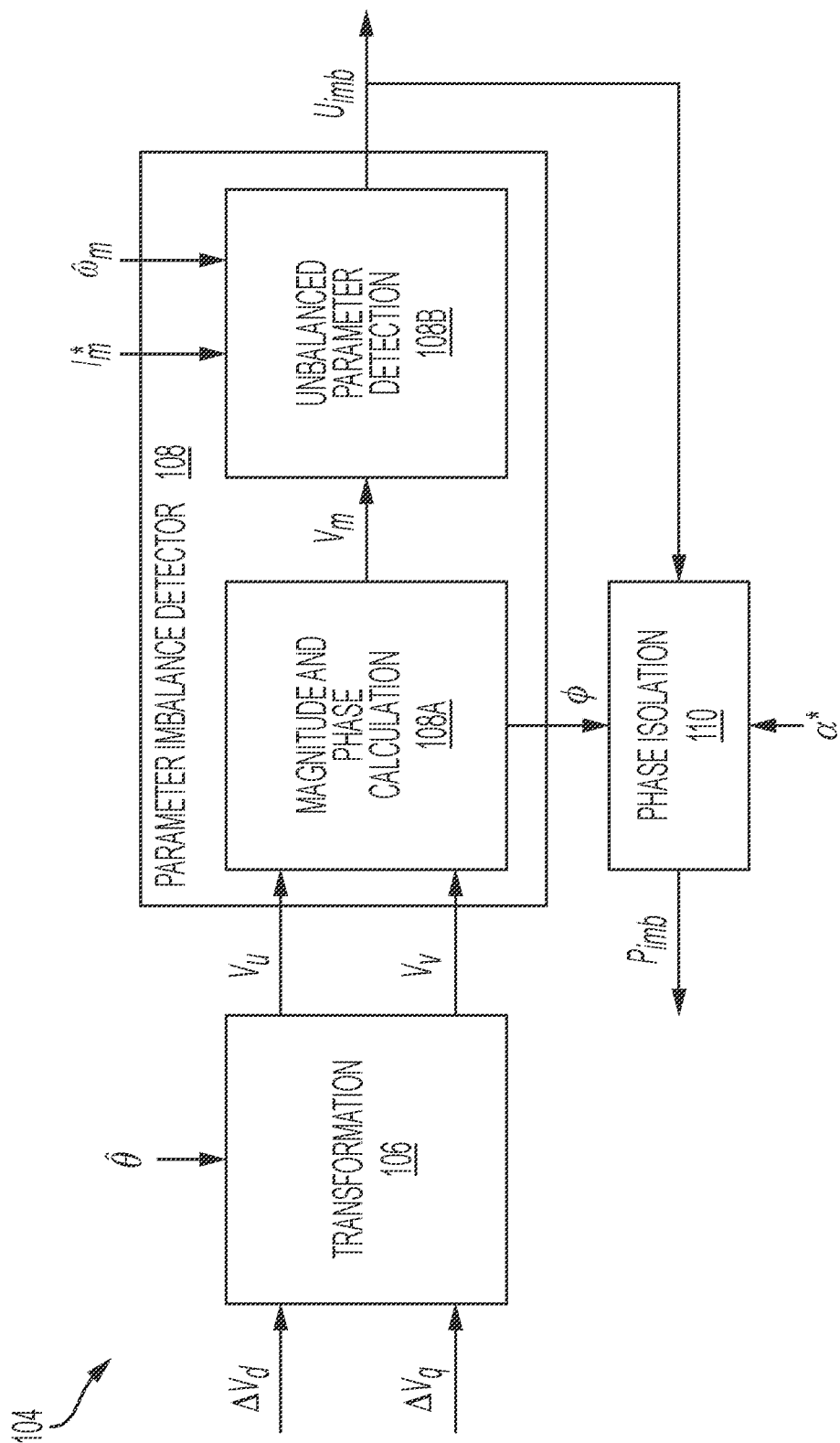
FIG. 3 illustrates the imbalance detector 104 in more detail according to some embodiments.

FIG. 3 illustrates the imbalance detector 104 in more detail according to some embodiments. The transformation block 106 converts the pulsating portion of output voltage commands $\Delta V_d$ and $\Delta V_q$ into the diagnostic voltages $V_u$ and $V_v$ using estimated position $\hat{\theta}$. The magnitude $V_m$ and phase $\phi$ of the diagnostic voltages are then obtained in a magnitude and phase calculation block 108A within the parameter imbalance detector 108. An unbalanced parameter detection block 108B utilizes the diagnostic voltage magnitude along with the current command magnitude $I_m^*$ (or the motor current magnitude estimate $\hat{I}_m$) and motor velocity estimate $\hat{\omega}_m$ to determine the parameter that is unbalanced ("unbalanced" and "imbalanced" may be used interchangeably herein), i.e., resistance R, inductance L or PM flux linkage $\lambda_m$, and sends out an u parameter detection signal $U_{imb}$. The logic for calculating $U_{imb}$ may expressed mathematically as follows:

$$U_{imb} = \begin{cases} \text{NONE}, & V_m < V_t \\ R, & V_m \geq V_t \ \& \ \hat{\omega}_m \leq \omega_r \ \& \ I_m^* \geq I_r \\ \lambda_m, & V_m \geq V_t \ \& \ \hat{\omega}_m \geq \omega_\lambda \ \& \ I_m^* \leq I_\lambda \\ L, & V_m \geq V_t \ \& \ \omega_{ll} > \hat{\omega}_m \geq \omega_{lh} \ \& \ I_{lh} > I_m^* \geq I_{ll} \end{cases} \quad (18)$$

where $V_t$ is an parameter imbalanced diagnostic detection voltage threshold, $I_r$ and $\omega_r$ are current magnitude threshold and velocity threshold respectively for resistance imbalance detection, $I_\lambda$ and $\omega_\lambda$ are current magnitude threshold and velocity threshold respectively for PM flux linkage imbalance detection and $I_{ll}$, $I_{lh}$, $\omega_{ll}$ and $\omega_{lh}$ are the lower and upper current magnitude thresholds and velocity thresholds respectively for inductance imbalance detection.

When an imbalance is detected in any of the parameters by the parameter imbalance detector 108, the phase isolation block 110 utilizes the diagnostic phase $\phi$ along with the current angle command $\alpha^*$ (or the current angle estimate $\hat{\alpha}$) to determine whether a single motor phase (out of phase A, B, C) is unbalanced or whether multiple phases are unbalanced by setting the unbalanced phase identifier signal $P_{imb}$ to A, B, C or M, where M indicates imbalance in multiple phases. In the case when a single phase is unbalanced, the phase isolation block 110 identifies the specific phase. The unbalanced phase detection logic is as follows:

$$P_{imb} = \begin{cases} A, & -\phi_w \leq \phi \leq \phi_w \\ B, & \phi_0 - \phi_w \leq \phi \leq \phi_0 + \phi_w \\ C, & -\phi_0 - \phi_w \leq \phi \leq -\phi_0 + \phi_w \\ M, & \text{OTHERWISE} \end{cases}$$

where $\phi_0 = \tan^{-1}\sqrt{3}$ and $\phi_w$ is a phase angle tolerance window for the unbalanced phase identification. Note that the diagnostic phase becomes equal to 0, $\phi_0$, $-\phi_0$ when the imbalance is in phase A, B, C respectively for any parameter. This may be determined by setting any of the imbalance or is determined by setting the value of the deviation of any parameter in any single phase to a non-zero value and settings the other deviations to zero. For instance, if $\Delta\lambda_b$ is non-zero while $\Delta\lambda_a$ and $\Delta\lambda_c$ are zero in (6) due to a PM flux linkage imbalance in phase B, the resulting phase angle becomes $\phi_0$. Similar calculations may be performed for the other parameters and phases using (10), (11) and (15).

Figure 4:
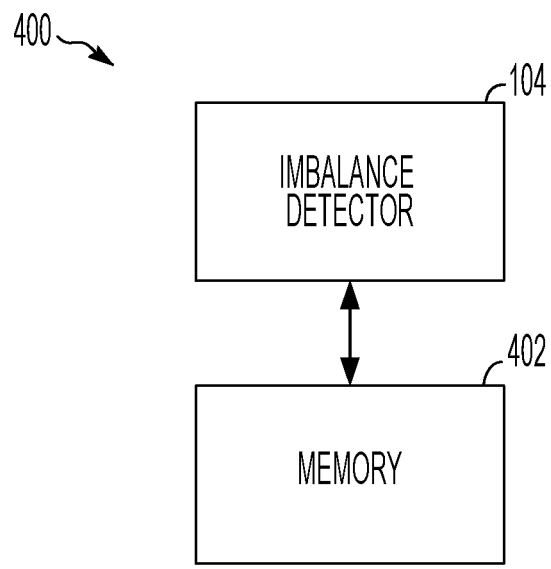
FIG. 4 generally illustrates a controller system according to the principles of the present disclosure.

FIG. 4 generally illustrates a controller system 400 according to the principles of the present disclosure. The controller system 400 includes the imbalance detector 104 communicatively coupled to a memory 402. The imbalance detector 104 may include a processor. The processor may include any suitable processor, such as those described herein. The memory 402 may store instructions that, when executed by the imbalance detector 104, cause the imbalance detector 104 to, at least, perform the techniques disclosed herein. In particular, the computer instructions, when executed by the imbalance detector 104, may cause the imbalance detector 104 to perform the operations of the method 500 as further described below with reference to FIG. 5.

Figure 5:
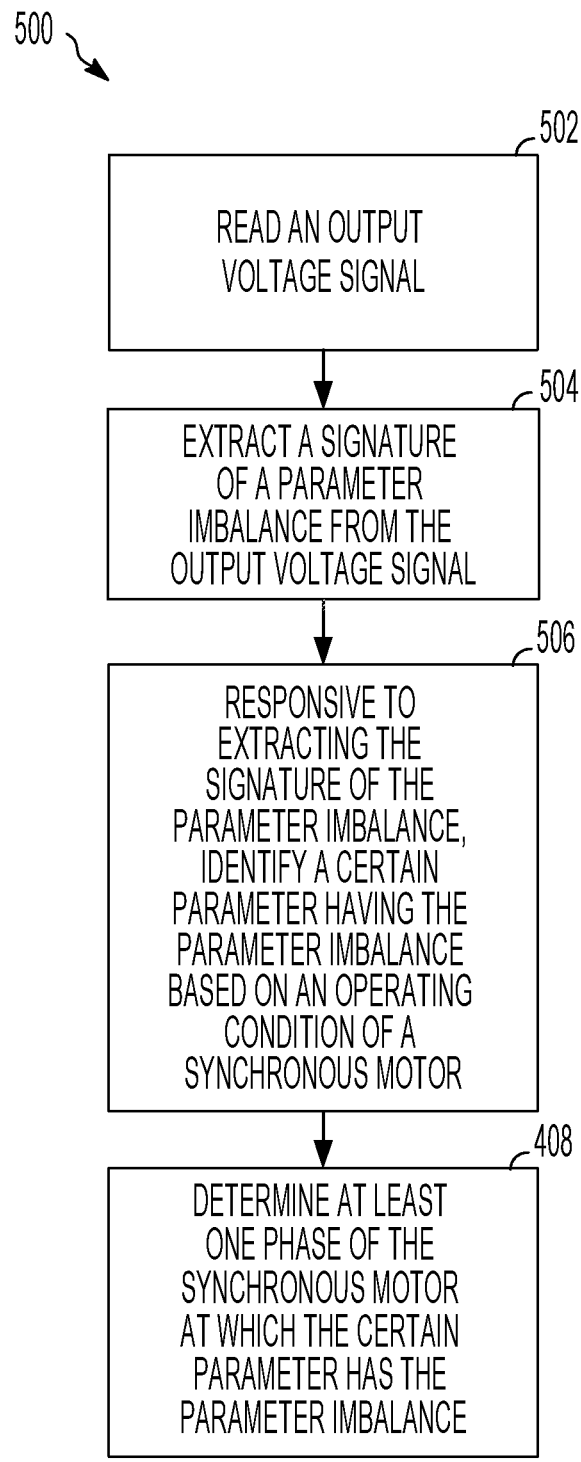
FIG. 5 is a flow diagram generally illustrating a parameter imbalance detection and identification method according to the principles of the present disclosure.

FIG. 5 is a flow diagram generally illustrating a parameter imbalance detection and identification method 500 according to the principles of the present disclosure. At 502, the method 500 reads an output voltage signal. The current controller 102 may generate the output voltage signal. At 504, the method 500 extracts a signature of a parameter imbalance from the output voltage signal. The synchronous motor drive 130 has the parameter imbalance. In some embodiments, the output voltage signal may include just a constant part, and in some embodiments, the output voltage signal may include a constant part and a sinusoidal part. If the output voltage signal just includes the constant part, then there may be no imbalance for a certain parameter because the sinusoidal part of the voltage output signal represents the pulsations that include the signature of the type of imbalance in the synchronous motor. Accordingly, when the output voltage signal includes the constant part and the sinusoidal part, the sinusoidal part is extracted as the signature of the parameter imbalance.

At 506, responsive to extracting the signature of the parameter imbalance, the method 500 identifies a certain parameter having the parameter imbalance based on an operating condition of the synchronous motor controlled by the synchronous motor drive 130. The parameters may include inductance, resistance, permanent magnet flux link, and the like. The operating condition corresponds to a speed of the synchronous motor satisfying a particular threshold and a current output by the synchronous motor satisfying a particular threshold. That is, operating region based diagnostic thresholds are setup to detect and isolate the different imbalances. The thresholds may include a first threshold where any values below the first threshold are considered "low", and a second threshold where any values above the second threshold are considered "high". Further, the range of values between the first and second threshold may be considered "medium".

Identifying the certain parameter having the parameter imbalance based on the operating condition of the synchronous motor includes determining a magnitude of the output voltage signal. Further, an identification of the certain parameter having the parameter imbalance based on the operating condition of the synchronous is made in response to the magnitude of the output voltage signal being non-zero (e.g., significant) during the operating condition.

For example, if the operating condition includes the speed of the motor below the first threshold (e.g., low) and the amount of current output above the second threshold (e.g., high), and a magnitude of the diagnostic voltage (e.g., output voltage signal) is non-zero, then a resistance imbalance is identified. If the operating condition includes the speed of the motor in between the first and second thresholds (e.g., medium) and the amount of current output in between the first and second thresholds (e.g., medium), and a magnitude of the diagnostic voltage is non-zero, then an inductance imbalance is identified. If the operating condition includes the speed of the motor above the second threshold (e.g., high) and the amount of current output below the first threshold (e.g., low), and a magnitude of the diagnostic voltage is non-zero, then a flux linkage imbalance is identified.

At 508, the method 500 determines at least one phase of the synchronous motor in which the certain parameter is manifesting the parameter imbalance. The determination of the at least one phase and/or the identification of the certain parameter may be made in real-time (e.g., less than 2 seconds). In some embodiments, the at least one phase may be determined based on phase values being unique for the phase. That is, the specific phase that has the imbalance may be determined because the phase values of the imbalance coefficients are unique for a given phase.

In some embodiments, a preventative action may be performed based on the certain parameter having the parameter imbalance, the at least one phase, or both. For example, a determination may be made that a fault is about to occur or has occurred based on the parameter balance and/or the phase including the parameter imbalance and a preventative action may include slowing down the motor, stopping the motor, or the like.

In some embodiments, a system for detecting an imbalance in a synchronous motor drive is disclosed. The system includes a synchronous motor controlled by the synchronous motor drive, a processor, and a memory that includes instructions. The instructions, when executed by the processor, cause the processor to: read an output voltage signal, extract a signature of a parameter imbalance from the output voltage signal, wherein the parameter imbalance is in the synchronous motor drive, responsive to extracting the signature of the parameter imbalance, identify a certain parameter having the parameter imbalance based on an operating condition of the synchronous motor, and determine at least one phase of the synchronous motor in which the certain parameter is manifesting the parameter imbalance.

In some embodiments, the signature of the parameter imbalance corresponds to a sinusoidal part of the output voltage signal. In some embodiments, the operating condition corresponds to a speed of the synchronous motor and a current output by the synchronous motor. In some embodiments, to identify the certain parameter having the parameter imbalance based on the operating condition of the synchronous motor, the instructions further cause the processor determine a magnitude of the output voltage, and identify the certain parameter having the parameter imbalance based on the operating condition of the synchronous motor in response to the magnitude of the output voltage signal being non-zero during the operating condition. In some embodiments, the certain parameter includes one of inductance, resistance, or permanent magnet flux linkage. In some embodiments, the instructions further cause the processor to determine the at least one phase in real-time. In some embodiments, the instructions further cause the processor to determine the at least one phase of the synchronous motor in which the certain parameter is manifesting the parameter imbalance based on phase values being unique for the phase. In some embodiments, the instructions further cause the processor to perform a preventative action based on the certain parameter having the parameter imbalance, the at least one phase, or both.

In some embodiments, a method for detecting an imbalance in a synchronous motor drive is disclosed. The method includes reading an output voltage signal. The method also includes extracting a signature of a parameter imbalance from the output voltage signal. The method also includes, responsive to extracting the signature of the parameter imbalance, identifying a certain parameter having the parameter imbalance based on an operating condition of a synchronous motor. The method also includes determining at least one phase of the synchronous motor at which the certain parameter has the parameter imbalance.

In some embodiments, the signature of the parameter imbalance corresponds to a sinusoidal part of the output voltage signal. In some embodiments, the operating condition corresponds to a speed of the synchronous motor and a current output by the synchronous motor. In some embodiments, identifying the certain parameter having the parameter imbalance based on the operating condition of the synchronous motor further comprises determining a magnitude of the output voltage signal, and identifying the certain parameter having the parameter imbalance based on the operating condition of the synchronous motor in response to the magnitude of the output voltage signal being non-zero during the operation condition. In some embodiments, the certain parameter includes one of inductance, resistance, or permanent magnet flux linkage. In some embodiments, the method further includes determining the at least one phase in real-time. In some embodiments, the method further includes determining the at least one phase of the synchronous motor in which the certain parameter is manifesting the parameter imbalance based on phase values being unique for the phase. In some embodiments, the method further includes performing a preventative action based on the certain parameter having the parameter imbalance, the at least one phase, or both.

In some embodiments, an electronic device includes a processor and a memory. The memory includes instructions that, when executed by the processor, cause the processor to: read an output voltage signal, extract a signature of a parameter imbalance from the output voltage signal, wherein the parameter imbalance is in the synchronous motor drive, responsive to extracting the signature of the parameter imbalance, identify a certain parameter having the parameter imbalance based on an operating condition of the synchronous motor, and determine at least one phase of the synchronous motor in which the certain parameter is manifesting the parameter imbalance.

In some embodiments, the signature of the parameter imbalance corresponds to a sinusoidal part of the output voltage signal. In some embodiments, the operating condition corresponds to a speed of the synchronous motor and a current output by the synchronous motor. In some embodiments, to identify the certain parameter having the parameter imbalance based on the operating condition of the synchronous motor, the instructions further cause the processor determine a magnitude of the output voltage signal, and identify the certain parameter having the parameter imbalance based on the operating condition of the synchronous motor in response to the magnitude of the output voltage signal being non-zero during the operation condition.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for detecting an imbalance in a synchronous motor drive, the system comprising:
    a synchronous motor controlled by the synchronous motor drive;
    a processor; and
    a memory that includes instructions that, when executed by the processor, cause the processor to:
        read an output voltage signal;
        extract a signature of a parameter imbalance corresponding to a pulsating portion of the output voltage signal, wherein the parameter imbalance is in the synchronous motor drive;
        responsive to extracting the signature of the parameter imbalance:
            determine a magnitude of the output voltage; and
            identify a certain parameter having the parameter imbalance based on an operating condition of the synchronous motor in response to the magnitude of the output voltage signal being non-zero during the operating condition; and
            determine at least one phase of the synchronous motor in which the certain parameter is manifesting the parameter imbalance.

2. The system of claim 1, wherein the signature of the parameter imbalance corresponds to a sinusoidal part of the output voltage signal.

3. The system of claim 1, wherein the operating condition corresponds to a speed of the synchronous motor and a current output by the synchronous motor.

4. The system of claim 1, wherein the certain parameter comprises one of inductance, resistance, or permanent magnet flux linkage.

5. The system of claim 1, wherein the instructions further cause the processor to determine the at least one phase in real-time.

6. The system of claim 1, wherein the instructions further cause the processor to determine the at least one phase of the synchronous motor in which the certain parameter is manifesting the parameter imbalance based on phase values being unique for the phase.

7. The system of claim 1, wherein the instructions further cause the processor to perform a preventative action based on the certain parameter having the parameter imbalance, the at least one phase, or both.

8. A method for detecting an imbalance in a synchronous motor drive, the method comprising:
    reading an output voltage signal;
    extracting a signature of a parameter imbalance corresponding to a pulsating portion of the output voltage signal, wherein the parameter imbalance is in the synchronous motor drive;
    responsive to extracting the signature of the parameter imbalance:
        determining a magnitude of the output voltage signal; and
        identifying a certain parameter having the parameter imbalance based on an operating condition of a synchronous motor controlled by the synchronous motor drive in response to the magnitude of the output voltage signal being non-zero during the operation condition; and
    determining at least one phase of the synchronous motor in which the certain parameter is manifesting the parameter imbalance.

9. The method of claim 8, wherein the signature of the parameter imbalance corresponds to a sinusoidal part of the output voltage signal.

10. The method of claim 8, wherein the operating condition corresponds to a speed of the synchronous motor and a current output by the synchronous motor.

11. The method of claim 8, wherein the certain parameter comprises one of inductance, resistance, or permanent magnet flux linkage.

12. The method of claim 8, further comprising determining the at least one phase in real-time.

13. The method of claim 8, further comprising determining the at least one phase of the synchronous motor in which the certain parameter is manifesting the parameter imbalance based on phase values being unique for the phase.

14. The method of claim 8, further comprising performing a preventative action based on the certain parameter having the parameter imbalance, the at least one phase, or both.

15. An electronic device comprising:
a processor; and
a memory that includes instructions that, when executed by the processor, cause the processor to:
  read an output voltage signal;
  extract a signature of a parameter imbalance corresponding to a pulsating portion of the output voltage signal, wherein the parameter imbalance is in a synchronous motor drive;
  responsive to extracting the signature of the parameter imbalance:
    determine a magnitude of the output voltage signal; and
    identify a certain parameter having the parameter imbalance based on an operating condition of a synchronous motor controlled by the synchronous motor drive in response to the magnitude of the output voltage signal being non-zero during the operation condition; and
  determine at least one phase of the synchronous motor at which the certain parameter has the parameter imbalance.

16. The electronic device of claim 15, wherein the signature of the parameter imbalance corresponds to a sinusoidal part of the output voltage signal.

17. The electronic device of claim 15, wherein the operating condition corresponds to a speed of the synchronous motor and a current output by the synchronous motor.

* * * * *